United States Patent
Bonhôte et al.

(10) Patent No.: US 8,449,752 B2
(45) Date of Patent: May 28, 2013

(54) TRAILING PLATED STEP

(75) Inventors: Christian R. Bonhôte, San Jose, CA (US); Trevor W. Olson, San Jose, CA (US); Aron Pentek, San Jose, CA (US); Thomas J. A. Roucoux, San Jose, CA (US)

(73) Assignee: HGST Netherlands B.V., San Jose, CA (US)

( * ) Notice: Subject to any disclaimer, the term of this patent is extended or adjusted under 35 U.S.C. 154(b) by 598 days.

(21) Appl. No.: 12/569,973

(22) Filed: Sep. 30, 2009

(65) Prior Publication Data
US 2011/0076393 A1    Mar. 31, 2011

(51) Int. Cl.
C25D 5/02    (2006.01)
G11B 5/127   (2006.01)
G11B 5/187   (2006.01)

(52) U.S. Cl.
USPC ............................. 205/122; 360/110; 360/122

(58) Field of Classification Search
USPC ...................... 205/122; 360/110, 122, 125.03
See application file for complete search history.

(56) References Cited

U.S. PATENT DOCUMENTS

| | | |
|---|---|---|
| 3,795,954 A | 3/1974 | Alex et al. |
| 4,646,184 A | 2/1987 | Goto et al. |
| 4,807,076 A | 2/1989 | Nakashima et al. |
| 4,861,398 A | 8/1989 | Fukuoka et al. |
| 4,951,166 A | 8/1990 | Schewe |
| 4,987,514 A | 1/1991 | Gailbreath et al. |
| 5,014,149 A | 5/1991 | Ibaraki |
| 5,075,956 A | 12/1991 | Das |
| 5,181,152 A | 1/1993 | Yan et al. |
| 5,193,039 A | 3/1993 | Smith et al. |
| 5,198,949 A | 3/1993 | Narisawa et al. |
| 5,245,493 A | 9/1993 | Kawabe et al. |
| 5,333,086 A | 7/1994 | Frey et al. |
| 5,572,390 A | 11/1996 | Saito et al. |
| 5,583,728 A | 12/1996 | Imazeki et al. |
| 5,600,519 A | 2/1997 | Heim et al. |
| 5,949,624 A | 9/1999 | Simmons et al. |
| 6,072,669 A | 6/2000 | Indeck |
| 6,337,783 B1 | 1/2002 | Santini |
| 6,430,806 B1 | 8/2002 | Chen et al. |
| 6,436,560 B1 | 8/2002 | Kato et al. |
| 6,466,403 B1 | 10/2002 | Sato et al. |
| 6,591,480 B1 | 7/2003 | Chen et al. |
| 6,760,190 B2 | 7/2004 | Kato et al. |
| 6,778,356 B2 | 8/2004 | Kawai et al. |

(Continued)

OTHER PUBLICATIONS

Z. J. Liu et al., Distribution of Slanted Write Field for Perpendicular Recording Heads with Shielded Pole, IEEE Transactions on Magnetics, vol. 41, No. 10, Oct. 2005, pp. 2908-2910.

(Continued)

*Primary Examiner* — Jonathan Johnson
*Assistant Examiner* — Bryan D. Ripa
(74) *Attorney, Agent, or Firm* — Patterson & Sheridan, LLP

(57) ABSTRACT

Methods for fabrication of magnetic write heads, and more specifically to fabrication of magnetic poles and trailing magnetic pole steps. A write pole may first be patterned on a substrate. Then a side gap material may be patterned along sidewall portions of the write pole. Thereafter, a masking layer may be deposited and patterned to expose a portion of the write pole. A trailing magnetic pole step may be formed on the exposed portion of the write pole.

14 Claims, 9 Drawing Sheets

U.S. PATENT DOCUMENTS

| | | |
|---|---|---|
| 6,791,793 B1 | 9/2004 | Chen et al. |
| 6,807,027 B2 | 10/2004 | McGeehin et al. |
| 6,906,894 B2 | 6/2005 | Chen et al. |
| 6,952,325 B2 | 10/2005 | Sato et al. |
| 6,954,332 B1 | 10/2005 | Hong et al. |
| 7,002,778 B2 | 2/2006 | Yazawa |
| 7,042,682 B2 | 5/2006 | Hu et al. |
| 7,065,737 B2 * | 6/2006 | Phan et al. ................ 430/22 |
| 7,149,045 B1 | 12/2006 | Mallary et al. |
| 7,159,302 B2 | 1/2007 | Feldbaum et al. |
| 7,185,415 B2 | 3/2007 | Khera et al. |
| 7,212,379 B2 | 5/2007 | Hsu et al. |
| 7,219,414 B2 | 5/2007 | Watabe et al. |
| 7,245,454 B2 | 7/2007 | Aoki et al. |
| 7,248,437 B2 | 7/2007 | Yazawa et al. |
| 7,249,407 B2 | 7/2007 | Kobayashi |
| 7,305,753 B2 | 12/2007 | Kobayashi |
| 7,343,664 B2 | 3/2008 | Khera et al. |
| 7,365,942 B2 | 4/2008 | Sasaki et al. |
| 7,375,925 B2 | 5/2008 | Sasaki et al. |
| 7,377,024 B2 | 5/2008 | Chen |
| 7,394,621 B2 | 7/2008 | Li et al. |
| 7,643,246 B2 | 1/2010 | Yazawa et al. |
| 2003/0193745 A1 | 10/2003 | Sato |
| 2004/0070874 A1 | 4/2004 | Sato |
| 2004/0090703 A1 | 5/2004 | Morita et al. |
| 2004/0145828 A1 | 7/2004 | Im |
| 2004/0196589 A1 | 10/2004 | Lille |
| 2004/0212923 A1 | 10/2004 | Taguchi |
| 2005/0105213 A1 | 5/2005 | Takeo et al. |
| 2005/0259357 A1 | 11/2005 | Kameda |
| 2006/0028770 A1 | 2/2006 | Etoh et al. |
| 2006/0098339 A1 | 5/2006 | Koyama et al. |
| 2006/0215314 A1 | 9/2006 | Chen |
| 2006/0291096 A1 | 12/2006 | Sasaki et al. |
| 2007/0064343 A1 | 3/2007 | Yazawa et al. |
| 2007/0067982 A1 | 3/2007 | Kobayashi |
| 2007/0121248 A1 | 5/2007 | Sasaki et al. |
| 2007/0268626 A1 | 11/2007 | Taguchi et al. |
| 2007/0285835 A1 | 12/2007 | Sun et al. |
| 2008/0117546 A1 | 5/2008 | Le et al. |
| 2008/0218902 A1 * | 9/2008 | Hosono et al. .......... 360/125.02 |
| 2008/0232001 A1 | 9/2008 | Bonhote et al. |

OTHER PUBLICATIONS

Trevor W. Olson et al., U.S. Appl. No. 12/569,962, entitled Magnetic Write Heads for Hard Disk Drives and Method of Forming Same, filed Sep. 30, 2009.

Sue S. Zhang et al., U.S. Appl. No. 12/569,957, entitled Slanted Bump Design for Magnetic Shields in Perpendicular Write Heads and Method of Making Same, filed Sep. 30, 2009.

* cited by examiner

TRAILING PLATED STEP

BACKGROUND OF THE INVENTION

1. Field of the Invention

Embodiments of the present invention generally relate to magnetic write heads, and more specifically to fabrication of magnetic poles and trailing magnetic pole steps.

2. Description of the Related Art

Magnetic head-based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly which in turn is attached to an actuator arm. As the magnetic disk rotates at an operating speed, the moving air generated by the rotating disk in conjunction with the physical design of the slider lifts the magnetic head, allowing it to glide or "fly" slightly above and over the disk surface on a cushion of air, referred to as an air bearing.

Magnetic disks are desirable mediums of storage because they are nonvolatile; i.e., no power is required to preserve the data. There has been increasing progress in the field of magnetic disk storage system technology in recent years. Such success has made storage systems an important component of modern computers. Some of the most important customer attributes of any storage system are the cost per megabyte, data rate, and access time. Improvements in areal density (the amount of information that can be placed within a given area on a disk drive), have been the chief driving force behind the historic improvement in storage cost. In fact, the areal density of magnetic disk storage systems continues to increase. As the magnetic particles that make up recorded data on a magnetic disk become ever smaller, technical difficulties in writing and reading such small bits occur.

Perpendicular recording is one approach to achieve larger areal densities when compared with longitudinal recording. In recent years, the increased demand for higher data rate and areal density has driven the perpendicular head design to scale toward smaller dimensions and the need for constant exploration of new head designs, materials, and practical fabrication methods.

SUMMARY OF THE INVENTION

Embodiments of the present invention generally relate to magnetic write heads, and more specifically to fabrication of magnetic poles and trailing magnetic pole steps.

One embodiment of the invention provides a method for fabricating a magnetic head. The method generally comprises patterning a write pole on a substrate, patterning a side gap material along one or more sidewall portions of the write pole, and depositing a masking layer over at least the write pole and the side gap material. The method further comprises patterning the masking layer to expose a portion of the write pole, and forming a trailing step on the exposed portion of the write pole.

Another embodiment of the invention provides a method for fabricating a magnetic head. The method generally comprises determining one or more dimensions of a magnetic pole and a first location on a substrate for forming the magnetic pole, determining one or more dimensions of a trailing step and a second location on the magnetic pole for forming the trailing step, and patterning the magnetic pole at the first location. The method further comprises measuring one or more dimensions of the patterned magnetic pole, adjusting at least one of the one or more dimensions of the trailing step and the second location based on the measured one or more dimensions of the patterned magnetic pole, and patterning the trailing step on the magnetic pole according to the adjusted one of the one or more dimensions of the trailing step and the second location.

Yet another embodiment of the invention provides a method for fabricating a magnetic head. The method generally comprises patterning a write pole on a substrate, patterning a side gap material along one or more sidewall portions of the write pole, measuring one or more dimensions of the patterned magnetic pole, and depositing a masking layer over at least the write pole and the side gap material. The method further comprises patterning the masking layer to expose a portion of the write pole, wherein dimensions of the exposed portion are determined based on the measured one or more dimensions of the patterned magnetic pole, and forming a trailing step on the exposed portion of the write pole.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to magnetic write heads, and more specifically to fabrication of magnetic poles and trailing magnetic pole steps. A write pole may first be patterned on a substrate. Then a side gap material may be patterned along sidewall portions of the write pole. Thereafter, a masking layer may be deposited and patterned to expose a portion of the write pole. A trailing magnetic pole step may be formed on the exposed portion of the write pole. While embodiments of the invention are particularly suitable for use in magnetic disk hard drives, this use should not be considered limiting as the magnetic write head of the invention could be used to write to any type of magnetic media, particularly (but not exclusively) where magnetic leakage and fringing is an issue.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
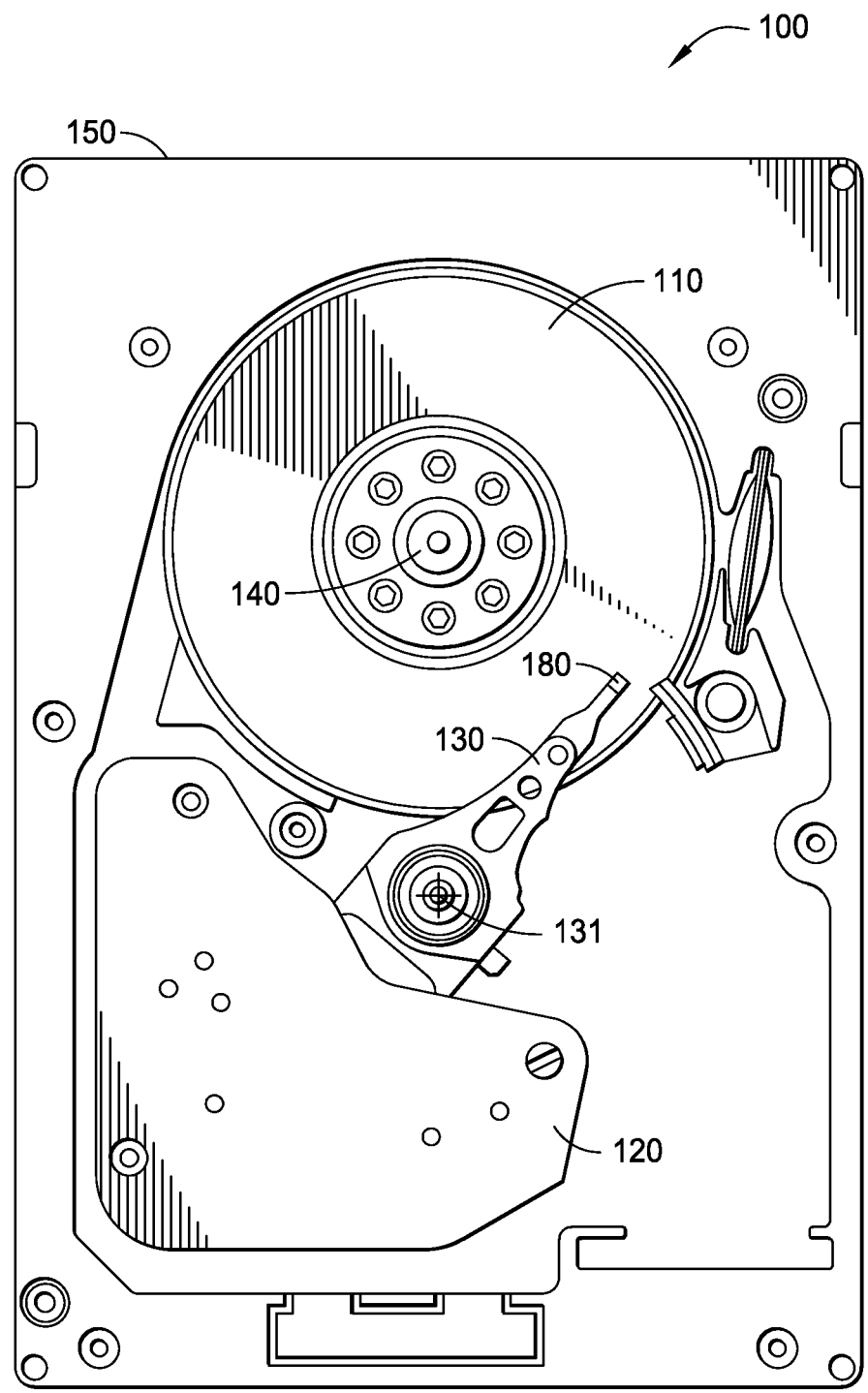
FIG. 1 illustrates an exemplary hard disk drive according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may contain circular tracks of data on both the top and bottom surfaces of the disk. An electromagnetic head 180 may be positioned on a track. As each disk spins, data may be written and read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

A plurality of magnetic disks may be stacked vertically in HDD 100. Each disk may have read and write tracks on each side of the disk. Therefore, electromagnetic heads may be placed on both sides of the disk. In some embodiments, a single magnetic head may be configured to access data tracks on the bottom face of a first disk and a top face of a second disk.

Each actuator arm 130 may be coupled to actuator 120. Actuator 120 may be a motor configured to control the swiveling movement of actuator arm 130 to place electromagnetic head 180 on a given data track. In one embodiment, the actuator arms may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 2A:
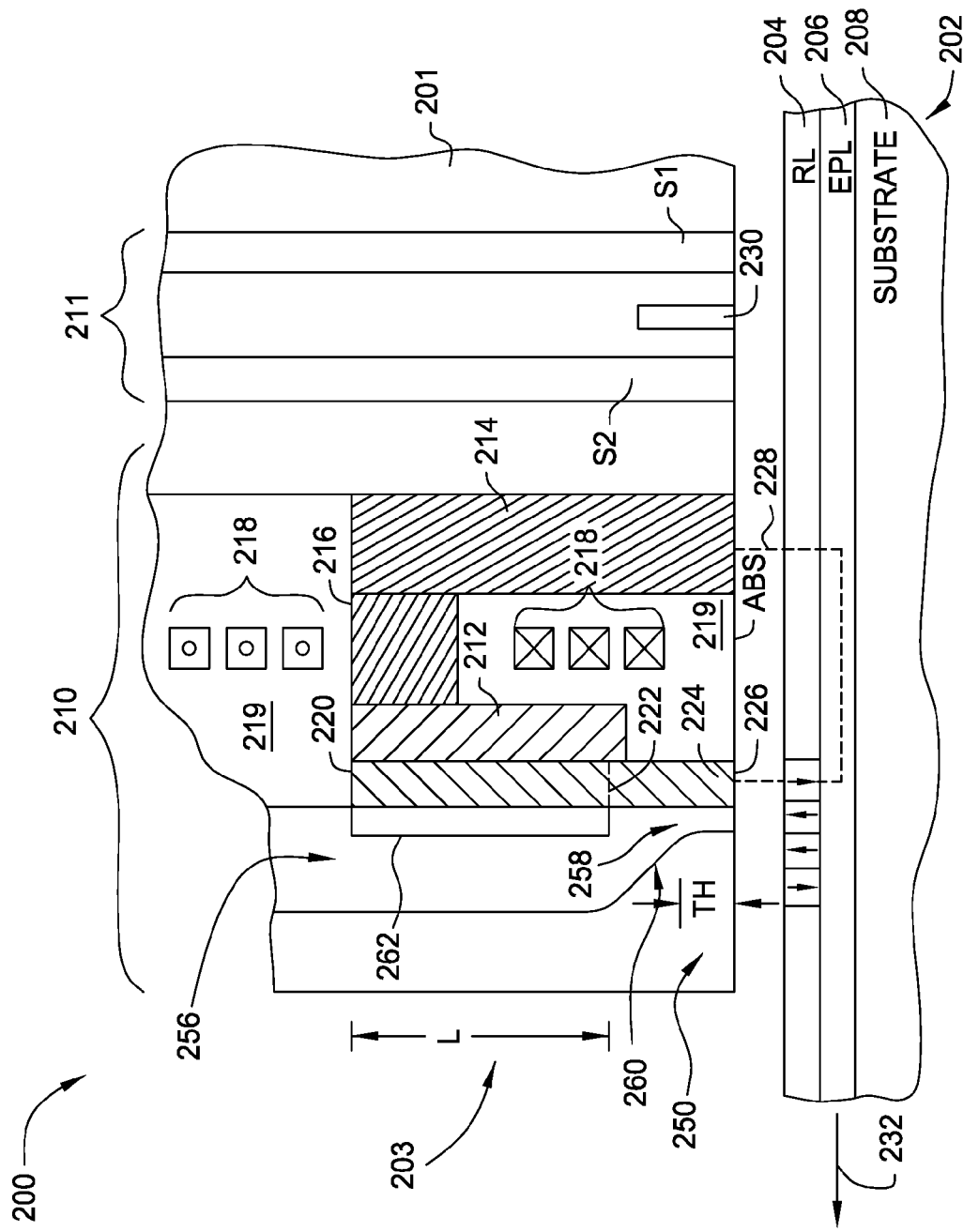
FIGS. 2A and 2B illustrate detailed views of a magnetic head, according to an embodiment of the invention.

FIG. 2A is a fragmented, cross-sectional side view through the center of an embodiment of a read/write head 200 mounted on a slider 201 and facing magnetic disk 202. The read/write head 200 and magnetic disk 202 may correspond to the electromagnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (EBL) 206 formed on a disk substrate 208. The read/write head 200 includes an air bearing surface (ABS), a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a magnetoresistive (MR) read head that includes an MR sensing element 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212, a flux return pole 214, and a yoke 216 connecting the main pole 212 and the flux return pole 214. The write head 210 also includes a thin film coil 218 shown in section embedded in non-magnetic material 219 and wrapped around yoke 216. A write pole 220 (also referred to herein as "WP 220") is magnetically connected to the main pole 212 and has an end 226 that defines part of the ABS of the magnetic write head 210 facing the outer surface of disk 202.

Figure 2B:
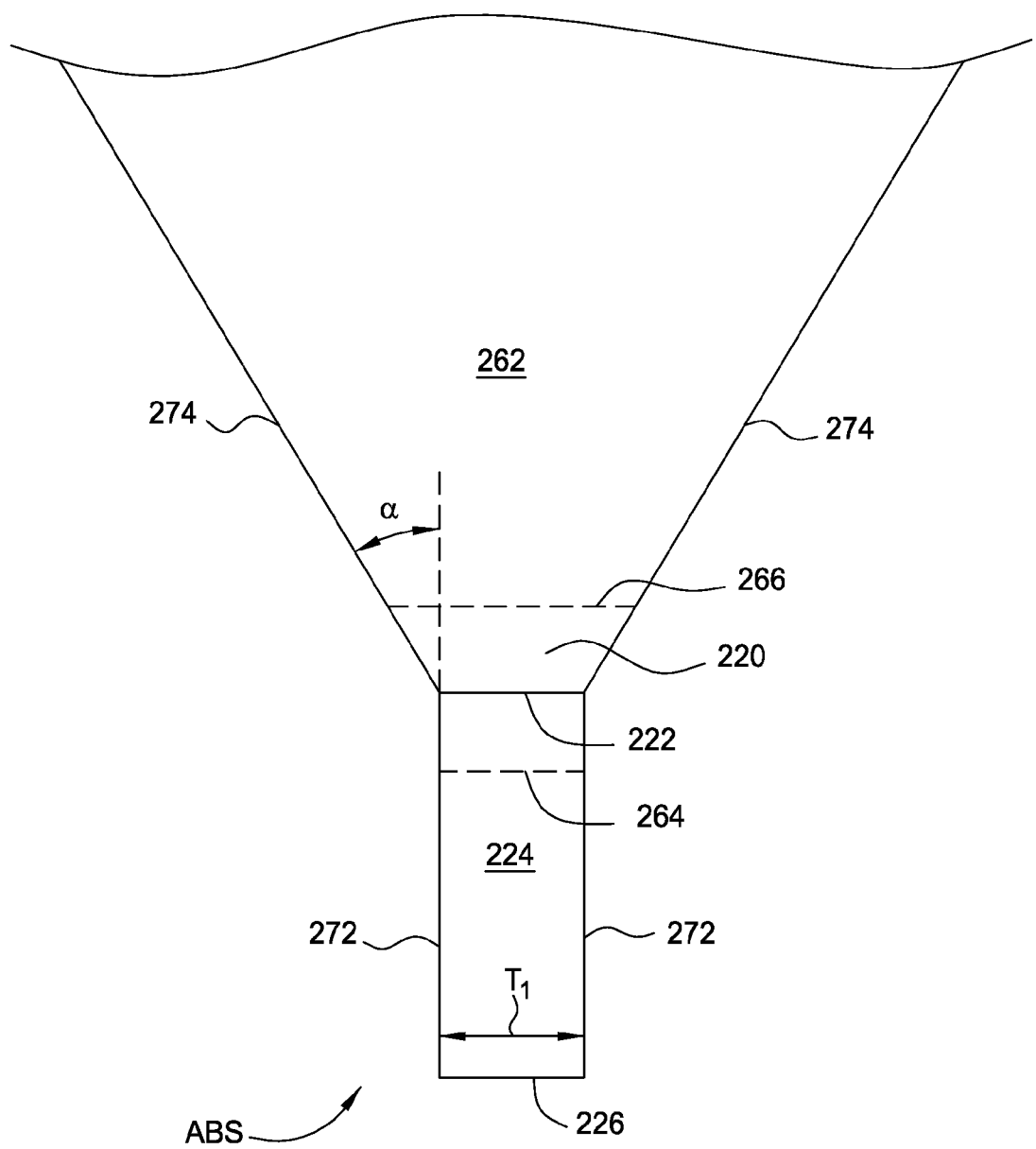

In some embodiments, write pole 220 is a flared write pole and includes a flare point 222 and a pole tip 224 that includes an end 226 that defines part of the ABS. In flared write pole embodiments, the width of the write pole 220 in a first direction (into and out of the page in FIG. 2A), increases from a first width at the flare point 222 to greater widths away from the ABS, as is shown in FIG. 2B. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

In some embodiments, the WP 220 includes a trailing step 262 of magnetic material that extends for a length L along the WP 220. The step 262 may extend from the flare point 222, to the end of the write pole 220 opposite the ABS. The length L may be between about 1 micron and about 15 microns. The trailing step 262 of magnetic material may be provided to increase the magnetic flux to the WP 220, by providing a greater thickness of the WP 220 in a direction generally parallel to the ABS and perpendicular to the width of the WP 220. In operation, write current passes through coil 218 and induces a magnetic field (shown by dashed line 228) from the WP 220 that passes through the RL 204 (to magnetize the region of the RL 204 beneath the WP 220), through the flux return path provided by the EBL 206, and back to the return pole 214.

FIG. 2A also illustrates one embodiment of a magnetic shield 250 that is separated from WP 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the WP 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width, forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to the other end of shield 250 (not shown), such that the maximum gap width is at the end of the shield opposite the ABS. The gap layer thickness increases from a first thickness (the throat gap width) at a first distance from the ABS (the throat gap height) to greater thicknesses in a direction away from the ABS, to a greatest thickness at a second distance (greater than the first distance) from the ABS. At a third distance from the ABS, greater than the second distance, the gap layer thickness is reduced in the region of the magnetic step 262.

FIG. 2B shows an enlarged side view of the WP 220 of FIG. 2A, with the shield layer 250 and the gap layer 256 removed to show details of the WP 220, according to an embodiment of the invention. In the illustrative embodiment, the magnetic step 262 covers part of the WP 220. The WP 220 includes flared sides 274, which extend from the flare point 222 away from the ABS, such that the main pole increases from a first thickness $T_1$ to greater thicknesses in a direction away from the ABS.

In some embodiments, the first thickness, $T_1$ is between 30 nm and 150 nm. The flared sides 274 form an angle α with respect to the non-flared (substantially parallel) sides 272 of the pole tip 224. In one embodiment α is between about 30° and about 60°. The trailing step 262 has a front edge in facing relationship to the ABS that may be aligned with the flare point 222 in some embodiments, such that the magnetic step 262 extends from the flare point 222 (between about 75 nm and about 275 nm from the ABS) and overlies the flared portion of the write pole 220. In this embodiment, the front edge of the magnetic step 262 and the flare point 222 are equidistant from the ABS. In other embodiments, the magnetic step 262 has a front edge 264 that is closer to the ABS than the flare point 222, such that part of the pole tip 224 is covered by the magnetic step 262.

In further embodiments, the magnetic step 262 has a front edge 266 that is further from the ABS than the flare point 222, such that part of the flared write pole 220 is not covered by the trailing step 262. The alignment of the magnetic step front edge and the flare point 222 may be adjusted during deposition of the trailing step 262, as described below, to maximize write flux while keeping fringing and leakage to a minimum. The distance between the trailing step front edge (264 or 266) and the flare point 222, is between 0 nm (when the front edge of the trailing step and the flare point 222 are aligned with one another) and 100 nm. Thus, the distance from the trailing step front edge and the ABS is between about 75 nm and 275 nm. The desired alignment between the magnetic step front edge and the flare point 222 depends on other structural and functional limitations of the write head 210. The alignment may be chosen to maximize the magnetic field produced by the head but at the same time suppress the stray fields.

Figure 3A:
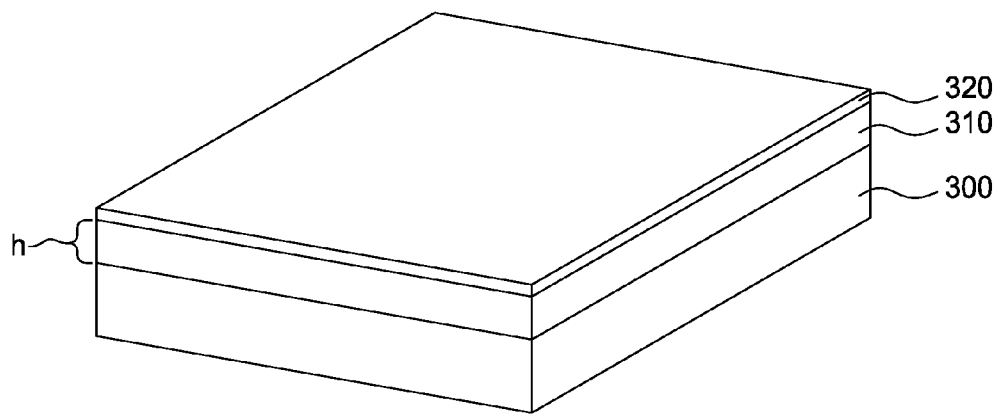
FIGS. 3A-3I illustrate fabrication of a magnetic pole and a magnetic pole trailing step, according to an embodiment of the invention.

FIGS. 3A-3F illustrate exemplary method steps for fabricating a write pole and a trailing step of the write pole, for example, the write pole 220 and trailing step 262 in FIGS. 2A and 2B, according to an embodiment of the invention. As illustrated in FIG. 3A, the method may involve providing a substrate 300. The substrate 300 may include one or more components of a magnetic head, for example, a read head portion 211, formed therein. The substrate 300 may also include one or more portions of a write head, for example the main pole 212, return pole 214, embedded coils 218, or the like (not shown in FIG. 3A) that are already formed therein.

As further illustrated in FIG. 3A, a first magnetic layer 310 may be formed on the substrate 300. The first magnetic layer 310 can be a single layer of a suitable high magnetic permeability material such as Cobalt-Iron (CoFe), Nickel-Iron (NiFe), or Cobalt-Nickel-Iron (CoNiFe) alloy. In alternative embodiments, the first magnetic layer 310 may include many laminations of layers of a high permeability, low coercivity materials such as CoFe separated by very thin lamination layers, such as thin layers of alumina, Cr, NiCr or Ru. The first magnetic layer 310, whether formed as a single layer or lamination of multiple layers can be deposited by sputter deposition. In one embodiment, the first magnetic layer 310 may have a height h of about 100 nm to about 300 nm.

In one embodiment, a series of mask layers 320 may be deposited on the first magnetic layer 310. The mask layers 320 may include a layer of hard mask material, which may include a layer of alumina and a layer of diamond like carbon (DLC). In some embodiments, the hard mask may include only a single layer, such as a single layer of alumina or a single layer of DLC, but improved critical dimension control of the write pole width may be achieved by using a bi-layer hard mask constructed of both alumina and DLC. The hard mask layers 320, including both the alumina layer and DLC layer may be deposited by sputter deposition. In some embodiments, the mask layers 320 may be omitted.

Figure 3B:
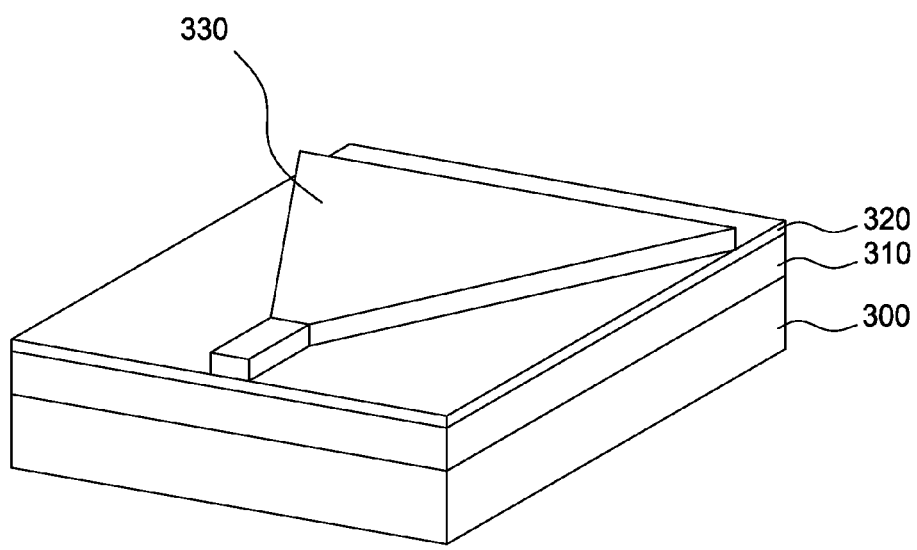

According to one embodiment, the magnetic layer 310 may be utilized to form a write pole, for example, the write pole 220 of FIG. 2. Accordingly, a photoresist layer may be deposited on the magnetic layer 310 and patterned photolithographically into a desired shape of the write pole. FIG. 3B illustrates a patterned photoresist layer 330 that may be used to form a write pole in the magnetic layer 310.

Figure 3C:
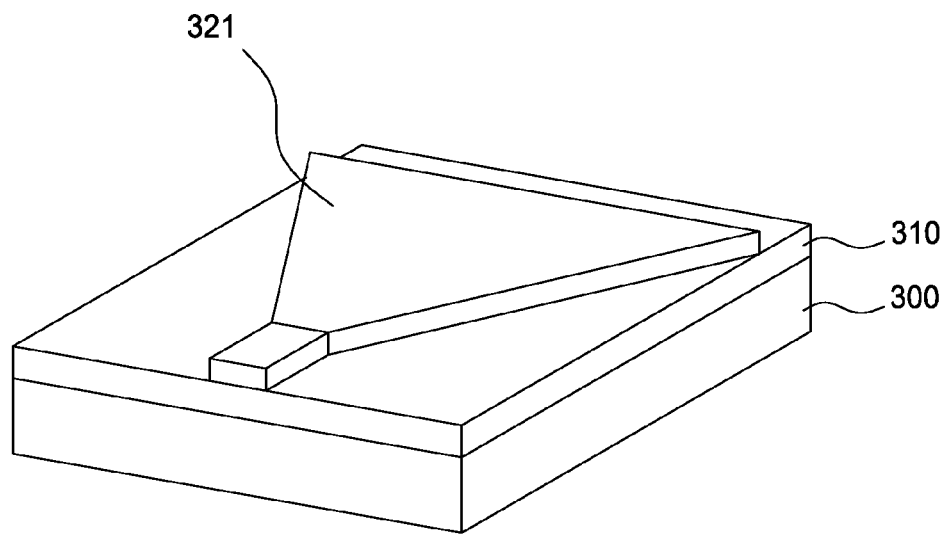

In one embodiment of the invention, a reactive ion etching (RIE) process may be used to remove portions of the hard mask layers 320 that are exposed by the photoresist layer 330, thereby transferring an image of the photoresist layer 330 into the hard mask layers 320. In the RIE process, chemically reactive plasma may be used to remove the exposed portions of the hard mask layers 320 deposited on the first magnetic layer 310. The plasma may be generated under low pressure (e.g. a vacuum) by an electromagnetic field. High-energy ions from the plasma may attack the exposed portions of the hard mask layers 320, thereby removing them. In one embodiment, the photoresist layer 330 may be completely consumed by the RIE process so that no photoresist layer 330 remains after the RIE process. FIG. 3C illustrates a portion 321 of the hard mask layers 320 that is left behind after the RIE process. Alternatively, an ion mill process may also be used to remove portions of the hard mask layer 320 that are exposed by the photoresist layer 330. In this embodiment the ion milling may be performed by either inert Ar gas or by a mixture of Ar and CHF3 gas, depending on the hard mask materials.

In one embodiment, an ion milling (IM) process may be performed to remove portions of the first magnetic layer 310 that are exposed by the remaining portions 321 of the hard mask layers, thereby forming a write pole. In one embodiment, the ion milling may be performed by projecting ions at an angle with respect to a normal to the surfaces of the layers 310 and 321. In one embodiment, this angled ion milling may remove portions of the first magnetic layer 310 in such a manner as to form angled sides on the write pole, resulting in a write pole having a trapezoidal cross-sectional shape.

Figure 3D:
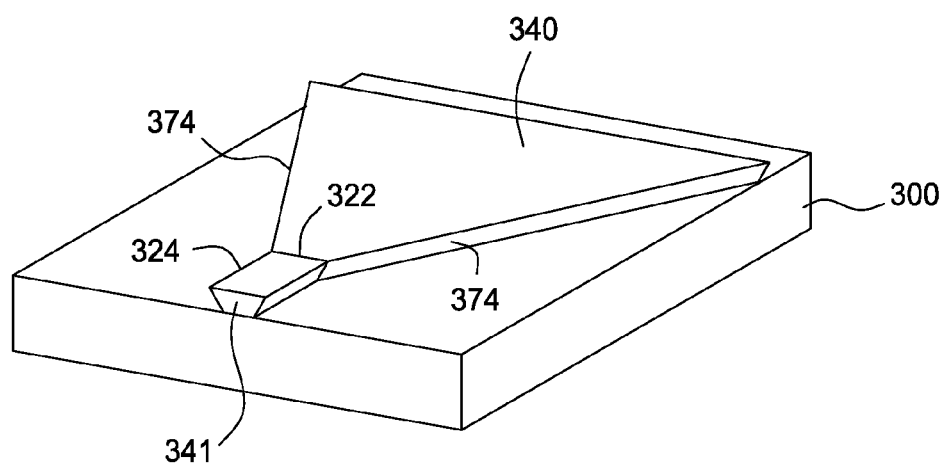

FIG. 3D illustrates an exemplary magnetic pole 340 formed as a result of the ion milling process described above. As shown in FIG. 3D, the magnetic pole 340 may include a pole tip portion 324, a flare point 322, and flared sides 374, which correspond to the pole tip 224, flare point 222, and flared sides 274, illustrated in FIG. 2B. FIG. 3D also illustrates a trapezoidal surface 341 of the write pole tip 324. In one embodiment the masking layer 321 may be removed by RIE and the top surface of the pole 340 may be exposed. In another embodiment the masking layer 321 (not shown in FIG. 3D) may be left on the top edge of the pole and removed in subsequent processing as described below.

Figure 3E:
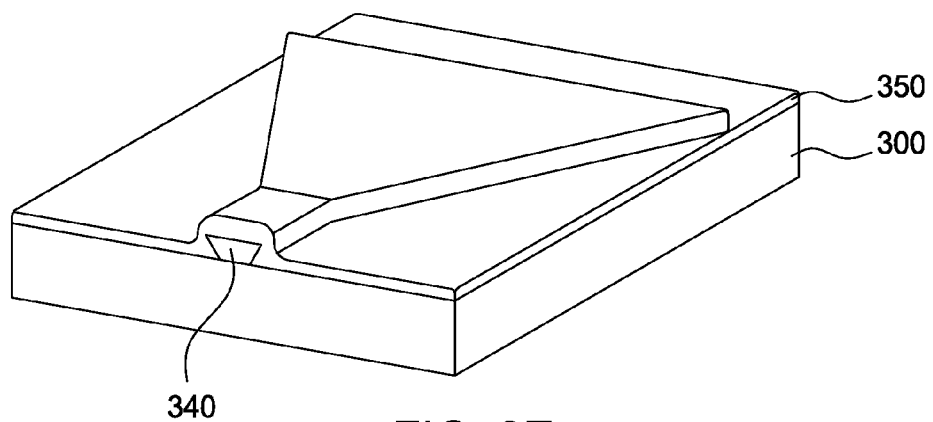
Figure 3F:
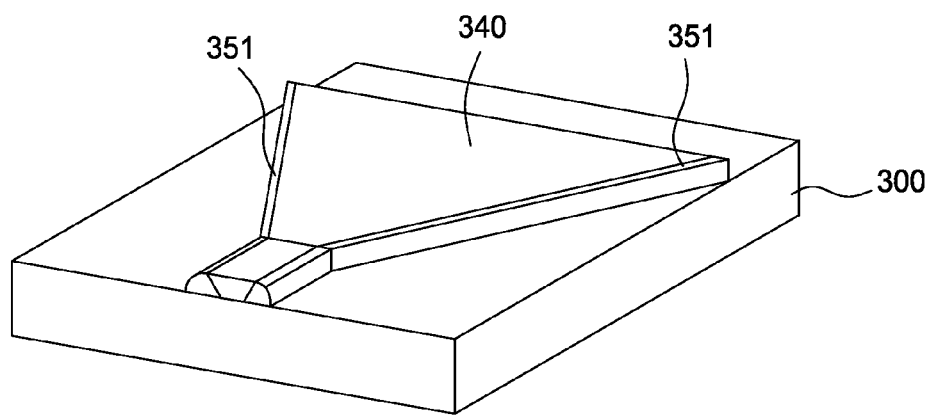

In one embodiment of the invention, after forming the write pole 340, a first non-magnetic layer 350 may be deposited on the write pole 340 and the substrate 300, as illustrated in FIG. 3E. The non-magnetic layer 350 may include alumina or some other non-magnetic material. In one embodiment, the non-magnetic layer 350 may be deposited by a conformal deposition technique such as atomic layer deposition (ALD) or some other conformal deposition process. As illustrated in FIG. 3E, the non-magnetic layer 350 may be deposited to such a thickness such that the write pole 340 is completely covered by the non-magnetic layer 350.

After depositing the non-magnetic layer 350 as described above, an ion milling process may be performed. In one embodiment, the IM process may be a directional process that removes a predefined thickness of the non-magnetic layer 350 as well as any remaining hard mask material 321 that may be still covering the top surface of the pole The IM process may remove enough of the non-magnetic layer, such that a surface of the magnetic pole 340 is exposed. In one embodiment, The IM process is preferably performed sufficiently to remove the non-magnetic layer 350 covering the write pole 340 and portions of the substrate 300, leaving vertical walls 351 remaining at the sides of the write pole 340, as is disclosed in FIG. 3F. In one embodiment of the invention, the vertical walls 351 of FIG. 3E may correspond to a portion of the side gap layer 256 (See FIG. 2A) that wraps around the write pole to insulate the write pole from a shield layer, e.g., the shield layer 250 illustrated in FIG. 2A.

Figure 3G:
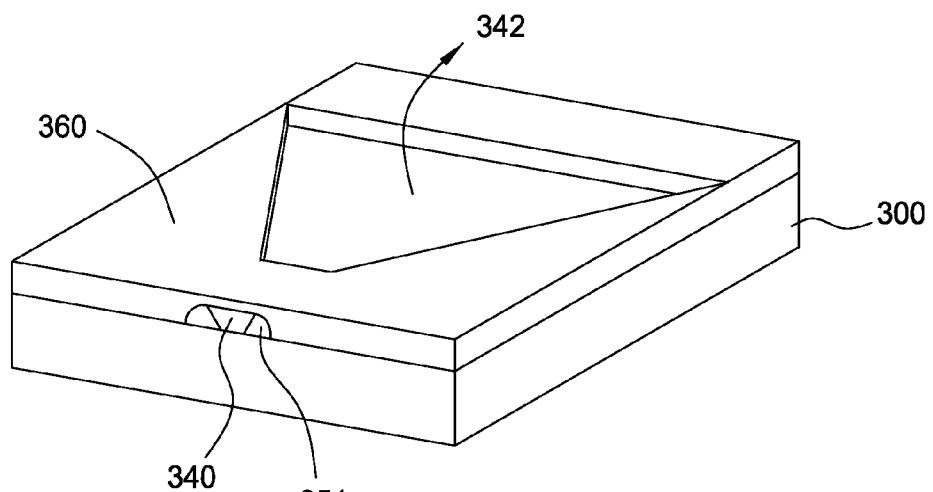

In one embodiment of the invention, after forming the write pole 340 and the side gap materials 351, a photoresist layer 360 may be deposited and photolithographically patterned over the write pole 340, side gaps 351, and substrate 300, as illustrated in FIG. 3G. In one embodiment, the photoresist layer 360 may expose a portion 342 of the write pole 340 over which a trailing step (e.g. the trailing step 262 magnetic step 262 of FIG. 2A), may be formed, as shown in FIG. 3G. In one embodiment, prior to depositing and patterning the photoresist layer 360, the dimensions of the fabricated write pole 340 may be measured. The measurements may be taken either after forming the magnetic pole, or alternatively, after forming the side gap materials. In one embodiment, the measurements of the write pole 340 may be used to adjust dimensions, location, etc., of the trailing step to ensure proper alignment of the trailing step and the write pole 340. Accordingly, the photoresist layer deposition and patterning may reflect the adjustments to the location, dimensions, etc., of the trailing step.

Figure 3H:
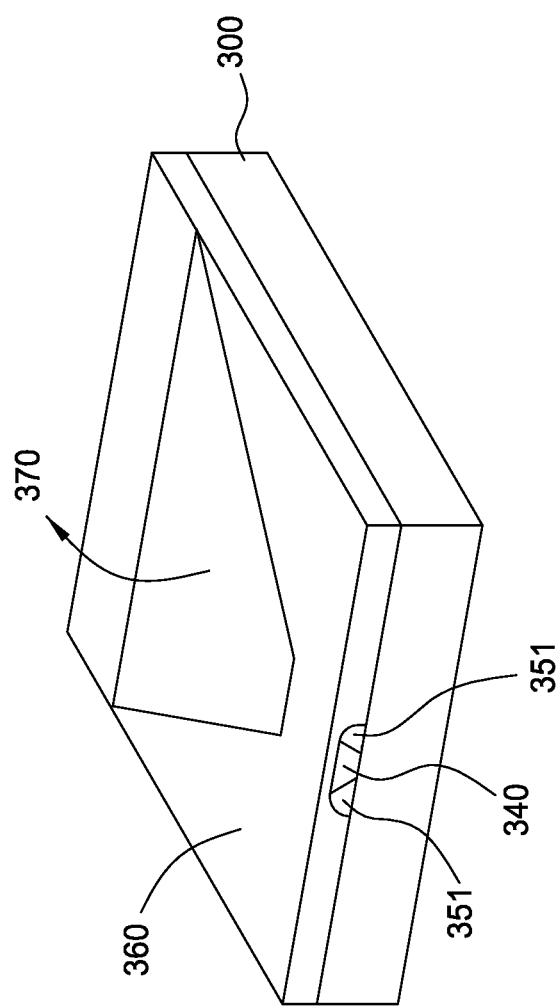

After patterning the photoresist layer 360, the trailing step may be formed over exposed portions 342 of the write pole 340. FIG. 3H illustrates a trailing step 370 that is formed over the exposed portion of the magnetic pole 340. The trailing step 370 may formed with the same or similar materials that were used to form the write pole 340. For example, the trailing step 370 may be a single layer of a suitable high magnetic permeability material such as Cobalt-Iron (CoFe), Nickel-Iron (NiFe) or Cobalt-Nickel-Iron (CoNiFe) alloy. In alternative embodiments, the trailing step 370 may include many laminations of layers of a high permeability, low coercivity materials such as CoFe separated by very thin lamination layers, such as thin layers of alumina. The trailing step 370, whether formed as a single layer or lamination of multiple layers can be deposited by sputter deposition.

In one embodiment, the exposed portions 342 (See FIG. 3G) of the write pole 340 may be used as a seed layer to electroplate the trailing step 370. However, in alternative embodiments, a separate seed layer may firs be deposited over the exposed portions 342 prior to depositing the trailing step. The seed layer may be formed by either non-magnetic materials such as Ru, Rh, or magnetic materials such as CoFe, NiFe or CoNiFe alloys. In other embodiments, any other reasonable deposition process may be used to form the trailing step.

Figure 3I:
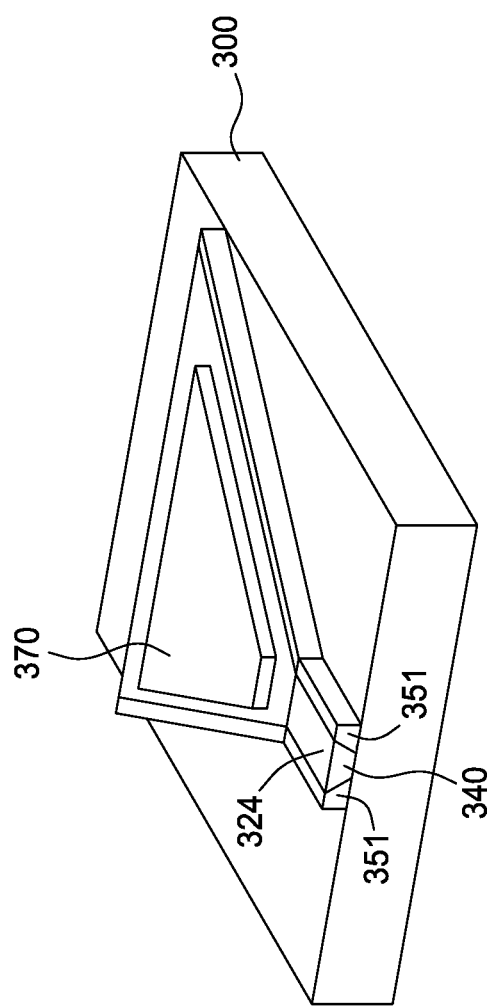

After forming the trailing step, the patterned photoresist layer 360 may be removed. FIG. 3I illustrates an exemplary trailing step 370 that is formed over the flared portion of the write pole 340, according to an embodiment of the invention. While the trailing step 370 is shown formed over less than the total surface area of the write pole 340, in alternative embodiments, the trailing step may completely cover the exposed portions of the write pole 340, except for portions of the pole tip 324.

Figure 4:
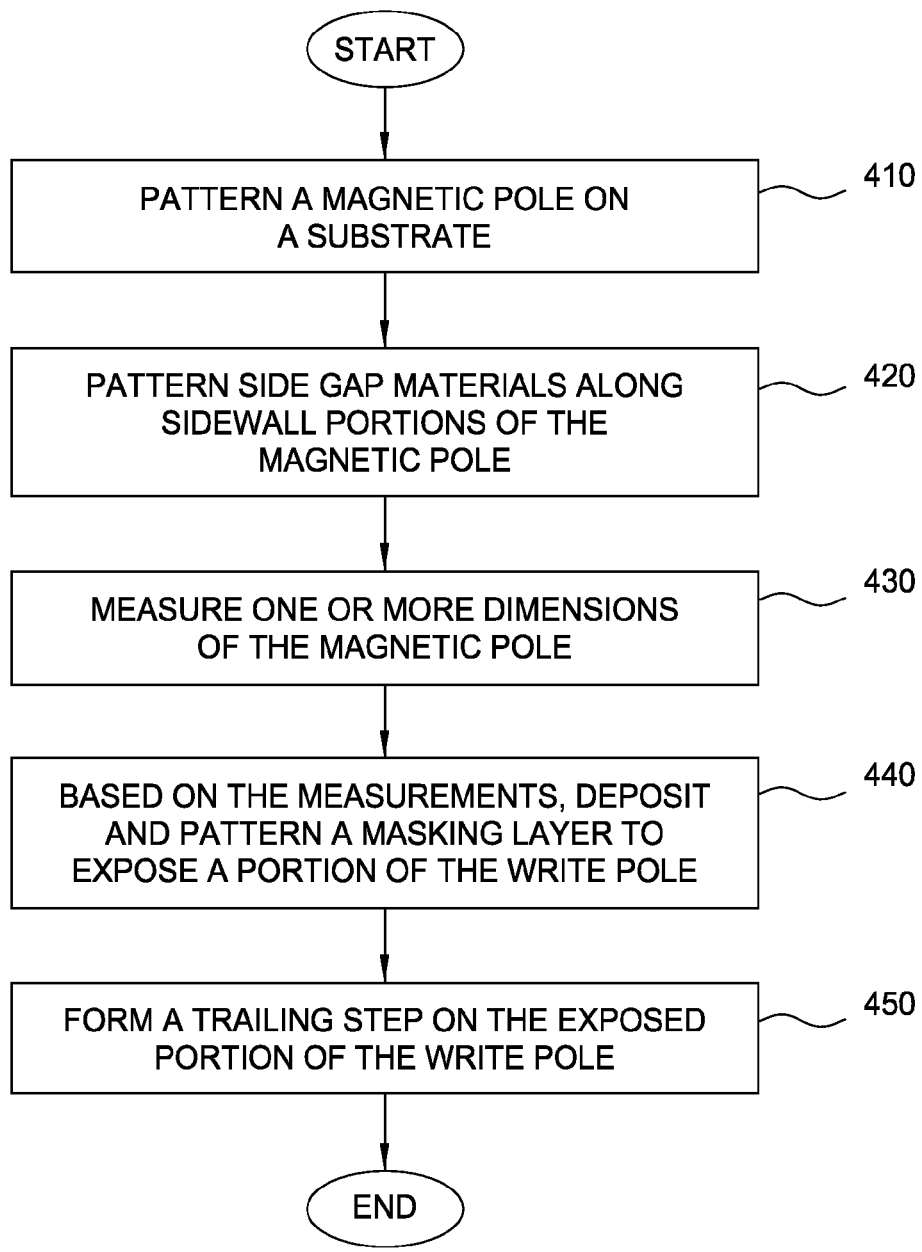
FIG. 4 is a flow diagram of exemplary operations performed during fabrication of a magnetic pole and magnetic pole trailing step, according to an embodiment of the invention.

FIG. 4 is a flow diagram of exemplary operations that may be performed during fabrication of a magnetic pole and a trailing step, according to an embodiment of the invention. The operations may begin in step 410 by patterning a magnetic pole on a substrate. In one embodiment, patterning the magnetic pole may involve performing the steps described hereinabove with reference to FIGS. 3A-3D. In step 420, a side gap material may be patterned along sidewall portions of the magnetic pole. In one embodiment, patterning the side gap materials along the sidewall portions of the magnetic pole may involve performing the steps described hereinabove with reference to FIGS. 3E and 3F.

In step 430, one or more dimensions of the magnetic pole may be measured. In some embodiments, the step 430 may be performed prior to the patterning of side gap materials in step 420. The dimensions of the magnetic pole may be measured to assist in the patterning of a trailing step on the magnetic pole, as is described above.

In step 440 a masking layer may be deposited on the write pole, side gap materials, and the substrate, and patterned to expose a portion of the write pole (corresponding to the steps described hereinabove with reference to FIG. 3G). In one embodiment, the deposition and patterning of the masking layer may be based on the measured dimensions of the magnetic pole. In step 440, a trailing step may be formed over portions of the write pole exposed by the masking layer. In one embodiment, forming the trailing step may involve performing the steps described hereinabove with reference to FIG. 3I. The masking layer may be removed after formation of the trailing step.

Embodiments of the invention facilitate formation of more precisely aligned write poles and trailing steps by providing allowing a magnetic pole to be patterned before formation of the trailing step. After patterning the write pole, the write pole may be measured, and the fabrication of the trailing step may be adjusted to properly align the trailing step with the patterned write pole.

For example, in one embodiment, one or more dimensions of a magnetic pole, a location of the magnetic pole on a substrate, one or more dimensions of a trailing step, and a second location of the trailing step relative to the magnetic pole may be predetermined and included in a fabrication design plan. However, due to fabrication defects during patterning of the magnetic pole, one or more dimensions of the magnetic pole, a location of the magnetic pole, and the like may be affected. Accordingly, in one embodiment, one or more dimensions of the patterned magnetic pole may be measured prior to fabrication of the trailing step. Based on the measurements of the magnetic pole, one or more dimensions of the trailing step, a location for fabricating the trailing step, or the like may be altered. The trailing step may thereafter be patterned based on the adjusted one or more dimensions or location.

While the foregoing is directed to embodiments of the present invention, other and further embodiments of the invention may be devised without departing from the basic scope thereof, and the scope thereof is determined by the claims that follow.

The invention claimed is:

1. A method for fabricating a magnetic head, comprising:
    patterning a write pole on a substrate;
    patterning a side gap material along one or more sidewall portions of the write pole;
    depositing a masking layer over at least the write pole and the side gap material;
    patterning the masking layer to expose a portion of the write pole; and
    forming a trailing step on the exposed portion of the write pole, the trailing step comprising laminations of magnetic layers separated by alumina, wherein the magnetic pole is a flared pole having a first width at an air bearing surface (ABS) portion of the magnetic pole and an increasing width starting at a flare point and extending away from the ABS, wherein the trailing step is formed only over a surface of the magnetic pole that extends between the flare point and a top of the magnetic pole, the top of the magnetic pole being at an opposite end of the ABS.

2. The method of claim 1, wherein forming the trailing step comprises electroplating the trailing step using the exposed portion of the write pole as a seed layer.

3. The method of claim 1, wherein the write pole and the trailing step are composed of the same materials.

4. The method of claim 1, wherein the side gap material is alumina.

5. The method of claim 1, wherein the side gap material forms a part of a shield gap configured to separate the magnetic pole from a magnetic shielding layer.

6. A method for fabricating a magnetic head, comprising:
    determining one or more dimensions of a magnetic pole and a first location on a substrate for forming the magnetic pole;
    determining one or more dimensions of a trailing step and a second location on the magnetic pole for forming the trailing step;
    patterning the magnetic pole at the first location;
    measuring one or more dimensions of the patterned magnetic pole;
    adjusting at least one of the one or more dimensions of the trailing step and the second location based on the measured one or more dimensions of the patterned magnetic pole; and
    patterning the trailing step on the magnetic pole according to the adjusted one of the one or more dimensions of the trailing step and the second location, the trailing step comprising laminations of magnetic layers separated by alumina, wherein the magnetic pole is a flared pole having a first width at an air bearing surface (ABS) portion of the magnetic pole and an increasing width starting at a flare point and extending away from the ABS, wherein the trailing step is formed only over a surface of the magnetic pole that extends between the flare point and a top of the magnetic pole, the top of the magnetic pole being at an opposite end of the ABS.

7. The method of claim 6, wherein the write pole and the trailing step are composed of the same materials.

8. The method of claim 6, wherein the write pole and the trailing step are composed of one of:
    Nickel-Iron (NiFe);
    Cobalt-Nickel-Iron (CoNiFe); and
    Cobalt-Iron (CoFe).

9. The method of claim 6, wherein patterning the trailing step comprises electroplating the trailing step using the exposed portion of the write pole as a seed layer.

10. A method for fabricating a magnetic head, comprising:
    patterning a write pole on a substrate;
    patterning a side gap material along one or more sidewall portions of the write pole;
    measuring one or more dimensions of the patterned magnetic pole;
    depositing a masking layer over at least the write pole and the side gap material;
    patterning the masking layer to expose a portion of the write pole, wherein dimensions of the exposed portion are determined based on the measured one or more dimensions of the patterned magnetic pole; and
    forming a trailing step on the exposed portion of the write pole, the trailing step comprising laminations of magnetic layers separated by alumina, wherein the magnetic pole is a flared pole having a first width at an air bearing surface (ABS) portion of the magnetic pole and an increasing width starting at a flare point and extending away from the ABS, wherein the trailing step is formed only over a surface of the magnetic pole that extends between the flare point and a top of the magnetic pole, the top of the magnetic pole being at an opposite end of the ABS.

11. The method of claim 10, wherein the write pole and the trailing step are composed of the same materials.

12. The method of claim 10, wherein the side gap material is alumina.

13. The method of claim 10, wherein the side gap material forms a part of a shield gap configured to separate the magnetic pole from a magnetic shielding layer.

14. The method of claim 10, wherein forming the trailing step comprises electroplating the trailing step using the exposed portion of the write pole as a seed layer.

* * * * *

UNITED STATES PATENT AND TRADEMARK OFFICE
CERTIFICATE OF CORRECTION

Page 1 of 1

PATENT NO.       : 8,449,752 B2
APPLICATION NO.  : 12/569973
DATED            : May 28, 2013
INVENTOR(S)      : Bonhôte et al.

It is certified that error appears in the above-identified patent and that said Letters Patent is hereby corrected as shown below:

On the Title Page, Assignee Item [73]

Please delete "San Jose, CA (US)" and insert -- Amsterdam (NL) -- therefor.

Signed and Sealed this
Eighth Day of April, 2014

Michelle K. Lee
*Deputy Director of the United States Patent and Trademark Office*